United States Patent [19]

Knaebel

[11] Patent Number: 5,032,150
[45] Date of Patent: Jul. 16, 1991

[54] PRESSURE SWING ADSORPTION

[75] Inventor: Kent S. Knaebel, Plain City, Ohio

[73] Assignee: The Ohio State University, Columbus, Ohio

[21] Appl. No.: 431,488

[22] Filed: Nov. 3, 1989

[51] Int. Cl.$^5$ .............................................. B01D 53/04
[52] U.S. Cl. ........................................ 55/20; 55/26; 55/62; 55/68
[58] Field of Search ................... 55/20, 25, 26, 58, 62, 55/68, 75

[56] References Cited

U.S. PATENT DOCUMENTS

| | | | |
|---|---|---|---|
| 3,430,418 | 3/1969 | Wagner | 55/62 X |
| 3,564,816 | 2/1971 | Batta | 55/26 |
| 3,636,679 | 1/1972 | Batta | 55/62 X |
| 3,717,974 | 2/1973 | Batta | 55/62 X |
| 3,738,087 | 6/1973 | McCombs | 55/62 X |
| 3,788,036 | 1/1974 | Lee et al. | 55/25 |
| 3,797,201 | 3/1974 | Tamura | 55/62 |
| 4,013,429 | 3/1977 | Sircar et al. | 55/33 |
| 4,077,779 | 3/1978 | Sircar et al. | 55/25 |
| 4,171,206 | 10/1979 | Sircar | 55/26 |
| 4,171,207 | 10/1979 | Sircar | 55/26 |
| 4,264,340 | 4/1981 | Sircar et al. | 55/25 |
| 4,359,328 | 11/1982 | Wilson | 55/26 |
| 4,468,238 | 8/1984 | Matsui et al. | 55/26 |
| 4,578,089 | 3/1986 | Richter et al. | 55/26 |
| 4,599,094 | 7/1986 | Werner et al. | 55/26 |
| 4,717,397 | 1/1988 | Wiessmer et al. | 55/26 |
| 4,744,803 | 5/1988 | Knaebel | 55/25 |
| 4,756,723 | 7/1988 | Sircar | 55/25 |
| 4,775,394 | 10/1988 | Yamano et al. | 55/26 |
| 4,816,039 | 3/1989 | Krishnamurthy et al. | 5/26 |

OTHER PUBLICATIONS

M. J. Matz et al., "Pressure Swing Adsorption: Effects of Incomplete Purge", *AIChE Journal*, vol. 34, No. 9, Sep. 1988, pp. 1486–1492.
K. S. Knaebel et al., "Pressure Swing Adsorption: Development of an Equilibrium Theory for Gas Separations", *Chemical Engineering Science*, vol. 40, No. 12, 1985, pp. 2351–2360.
M. J. Matz et al., "Temperature Front Sensing for Feed Step Control in Pressure Swing Adsorption", *Ind. Eng. Chem. Res.* 1987, 26, 1638–1645.
"Gas Purification by Pressure Swing Adsorption" by Daniel Tondeur and Phillip C. Wankat, *Separation and Purification Methods*, 14(2), pp. 157–212 (1985).

*Primary Examiner*—Robert Spitzer
*Attorney, Agent, or Firm*—Frank H. Foster

[57] ABSTRACT

A pressure swing adsorption cycle comprised of blowdown, purge, pressurization, feed, pressure equalization and rinse steps provided recovery from an atmospheric air feed, essentially dry and free of carbon dioxide, of a high yield of high purity nitrogen gas and a high yield of a product gas rich in oxygen as well as recovery of a residual feed byproduct gas for recycle with the air feed.

8 Claims, 6 Drawing Sheets

FIG. 8

PRESSURE SWING ADSORPTION

TECHNICAL FIELD

This invention relates to a method of pressure swing, adsorption (PSA) which includes a plurality of steps and which provides recovery from air essentially free from moisture and carbon dioxide of a significantly pure primary product (nitrogen) gas, a significantly pure second product (oxygen) gas and residual feed gas. More particularly, in comparison to a conventional PSA cycle method, involving a usual cycle of four steps of blowdown, purge, pressurization and feed, the present invention concerns an additional two steps, referred to as pressure equalization and rinse, with these additional steps in combination with the usual cycle of four steps and with other elements of the invention, thus enabling, in addition to recovery of pure primary product, a recovery of a residual feed byproduct gas and the significantly pure second product with remarkable purities and recoveries for the two product gases.

BACKGROUND

Pressure swing adsorption (PSA) is a known method for the separation of gases. A relatively recent review of diverse PSA cycles has been presented by D. Tondeur and P. C. Wankat, "Separation and Purification Methods", 14(2), 157-212 (1985). This review in its FIG. 2, page 160, illustrates schematically the usual four steps of a frequently used PSA cycle, namely the four steps of compression (i.e. pressurization), high pressure production (i.e. feed), decompression (i.e. blowdown), and low pressure purge, although PSA cycles, many commercialized, comprising as few as two to more than ten steps are known and discussed in this review.

Of interest is U.S. Pat. No. 4,264,340, S. Sircar et al., who teaches a vacuum swing adsorption (VSA) process, which provides purified oxygen and nitrogen by a VSA cycle including a rinse step. A U.S. Pat. No. 4,013,429, S. Sircar et al., also teaches another adsorption process for air fractionation to provide a high purity nitrogen product gas and an oxygen-enriched gas fraction, which process includes a nitrogen rinse step.

BRIEF DISCLOSURE OF INVENTION

The present invention provides a pressure swing adsorption process whereby there can be provided from an atmospheric air feed, whose moisture (i.e. water) and carbon dioxide has been removed, a high yield of a high purity nitrogen product gas and also a high yield of a product gas rich in oxygen.

A practice of the invention involves principally proceeding by repeated cycles comprising in an individual cycle the following sequence of steps:

1. Feed Step

Pretreated atmospheric air feed from which any solid particulates therein have been removed already and whose pretreatment has removed moisture (i.e. water) and carbon dioxide therefrom so as to provide gaseous air, which is essentially dry and free of carbon dioxide, is passed under pressure through a column of an adsorbent, selective to the nitrogen gas component of the air in comparison to the oxygen component of the air, which column had been presaturated and brought to a superatmospheric pressure by pure oxygen (such as for start up) or with product oxygen rich gas from a previous operation cycle of the invention's method. This flow of gaseous air through the column is at a superatmospheric pressure such that nitrogen is preferentially adsorbed providing an exiting effluent of a product gas rich in oxygen. As the flow of gaseous air continues to proceed through the column, a front of nitrogen adsorption on the adsorbent proceeds to advance progressively in the adsorbent from the feed entrance of the column to the exit of the column, and just when breakthrough is imminent (i.e. the front is close to the exit end of the adsorbent in the column) then the air feed is ceased. The exiting effluent of a product gas rich in oxygen is passed to a collector tank from which a portion can be subsequently returned to the column for use in the pressurization step and with the remaining portion withdrawn, or available for withdrawing, for any desired use.

2. Pressure Equalization Step

To ensure that there is no surge of gas in the rinse step to follow, the contents of the column are brought to the same pressure as the air feed, which under pressure was passed in the feed step into the column, by opening valves to the air feed tank and allowing the contents of the column to reach the same pressure as the air feed tank with the valve closed to the collector tank for the product gas rich in oxygen. For some embodiments of the PSA method of the invention, the inclusion of Step 2 (Pressure Equalization Step) is inconsequential with Step 2 being omitted from the sequence of steps in a cycle and within the sequence of steps then proceeding directly from Step 1 to Step 3. This dropping of Step 2 from the sequence of steps comprising a PSA cycle is permissible where procedures, conditions, apparatus, etc. permit avoidance of surges of unwanted gas which can be detrimental to yield and purities of product gases.

3. Rinse Step

The rinse step begins by feeding under pressure of pure nitrogen (such as for start up) or high purity nitrogen product gas to the column of adsorbent with the feeding of this nitrogen stream being in a direction counter to direction of the air feed stream in the feed step. The nitrogen stream displaces the air in the column with the air being recovered in the feed tank and in so doing the adsorbent bed becomes saturated with nitrogen under pressure. The air displaced from the column flows to the air feed tank.

4. Blowdown Step

During this step the nitrogen under pressure in the column by opening the valve to a nitrogen product surge tank flows to the nitrogen product surge tank. The contents of the column blow down in pressure to a lower pressure found in the nitrogen product surge tank in comparison to the somewhat higher pressure of the nitrogen in the column. The blowdown may be only to about atmospheric pressure. However, in some instances, if desired may be to a subatmospheric pressure, possible in the order of about one-fifth atmosphere, if the method is operated with the nitrogen product surge tank employing such a low pressure. Flow of the nitrogen from the column to the nitrogen product surge tank is in the direction counter to the direction of the air feed into the column in the feed step. A portion of this nitrogen in nitrogen product surge tank is recompressed for use in the rinse step of subsequent repeated cycles and the remaining portion may be withdrawn, or is available for withdrawing, if desired via the nitrogen product tank, for any desired use.

5. Purge Step

During this step oxygen is fed to the column at essentially the same pressure attained during the blowdown step. The oxygen is fed to the column in a direction counter to the direction of the feed stream in Step 1 so as to remove from the column and its adsorbent additional nitrogen which is withdrawn and flowed to the purge waste tank and from there it may be compressed and passed to the atmosphere or to the feed air tank. Upon the purge step reaching completion, or very close thereto, i.e. the removal of substantially all nitrogen adsorbed by the adsorbent during the feed and rinse steps, as indicated by the front of desorbed nitrogen on the adsorbent progressively proceeding to the column end, appropriate valves are closed and opened with the PSA cycle proceeding to the next step in sequence.

6. Pressurization Step

This step commenced upon the opening and closing of the appropriate and requisite valves including those of the just proceeding purge step and proceeds with the requisite valve openings and closing so as to pressurize the column with product oxygen rich gas from a previous cycle by flowing into the column in a direction counter to the direction of air feed in the feed step until the column is saturated and at a desired high or superatmospheric pressure for initiation of a repetition of the proceeding sequence of steps.

Thereafter the cycle is repeated commencing with the above described step 1, Feed Step.

BRIEF DESCRIPTION OF DRAWINGS

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

Figure 1:
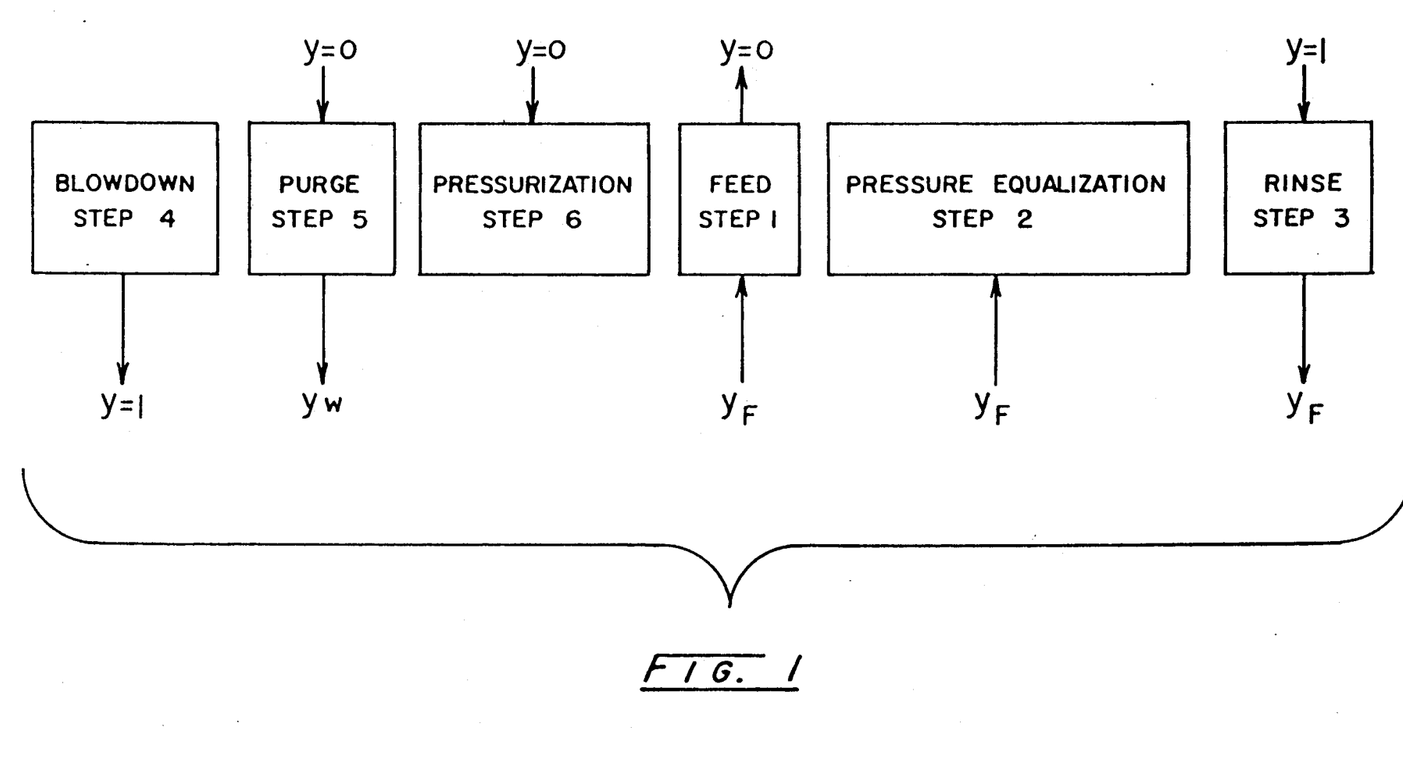
FIG. 1 presents in schematic format a sequence of steps comprising an embodiment of the PSA method of the invention.

With reference to FIG. 1, at the top reading from left to right in sequential order are listed individual steps comprising an embodiment of one cycle of the PSA method of the invention. Below the wording of each step is shown a rectangular block as a schematic representation of a column filled with a bed of adsorbent. Arrows at the top and bottom of the individual blocks show the directions of stream flows with their mole fraction of the preferably adsorbed gas (i.e. nitrogen) represented as "Y" and expressed as a numerical value of 0 or 1 or as that of its specific stream designated by the subscripts for Y of W, which represents waste or residual feed by-product gas, and of F, which represents the air feed stream. From the arrows designating flows it is readily apparent by comparison to the various steps the flows entering and exiting from the column which flow in a direction counter to another flow.

Figure 2:
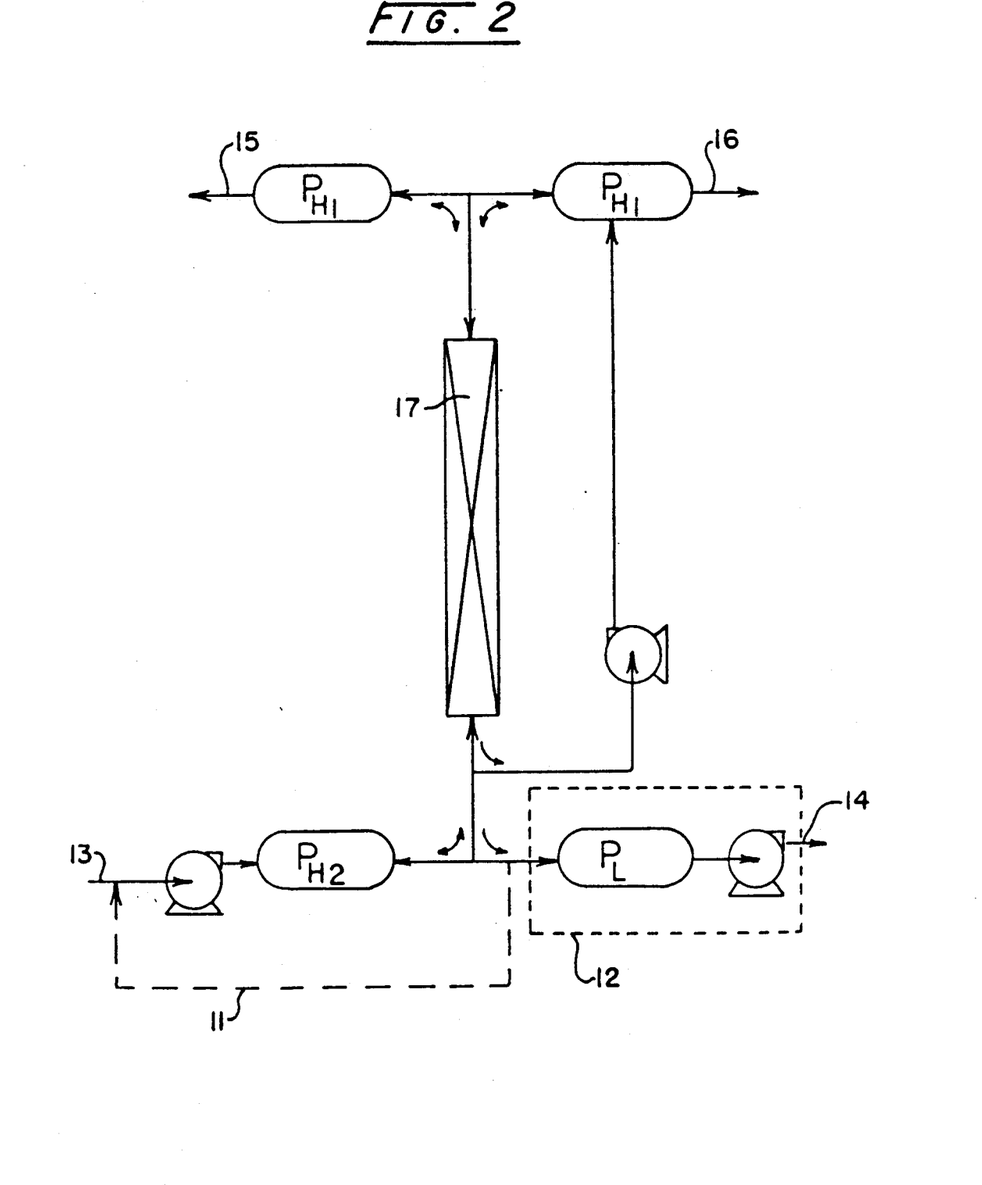
FIG. 2 provides a schematic diagram of the basic flowsheet of an embodiment of the method of the invention.

With reference to FIG. 2, which presents a schematic flowsheet of the six-step PSA process of the invention, and from the arrows thereon designating flow directions and the broken-line conduit designating optional recycle and the broken-line area encompassing optional elements for expediting the purge step's obtaining of useful subatmospheric pressure, all taken in conjunction with FIG. 1 and other Figures provide additional insight to the invention.

So that letter and script notations shown on FIG. 2 and those included in other Figures and Description, which follows, can be understood and be meaningful there follows a listing below of the various notations used in this disclosure's teachings.

NOTATION $A_{CS}$ cross-sectional area
$k_j$ equilibrium isotherm distribution coefficient
$L$ adsorbent bed length
$N$ moles
$P$ absolute pressure
$R$ gas constant
$T$ absolute temperature
$t$ time
$u$ interstitial velocity
$X$ fraction of partial purge
$y$ mole fraction of component A (more strongly adsorbed)
$z$ axial position

Greek Symbols $\beta$  $\beta_A/\beta_B$ $$\beta_j \; 1/\left(1 + \left(\frac{1-\epsilon}{\epsilon}\right)k_j\right)$$

$\epsilon$ bed void fraction
$\gamma$  $1 + (\beta - 1)\, Y$
$\Delta$ incremental increase in the moles required for pressurization due to incomplete purge
$\phi$  $\epsilon A_{CS} L \, P_L/\beta_A R T$
$\psi_i$ pressure ratio $= P_{Hi}/P_L$

Subscripts

A more strongly adsorbed component

B less strongly adsorbed component
exp experimental
F feed
H refers to feed step
HP refers to product of feed step
i refers to a species "i"
L refers to purge step
PR refers to pressurization
PU refers to purge
PU* refers to complete purge
R refers to rinse
RP refers to rinse product
S condition following the pressurization step
SH refers to shock wave
W refers to waste or residual feed byproduct gas For illustrative purposes, the operating cycle for practice of the PSA method of the invention is described below in the context of air separation, which is the specific utility for which specific examples were run.

The cycle begins with the purge step, during which pure oxygen is admitted at $P_L$, and the contents of the column are removed as waste. Subsequently, during the pressurization step the adsorbent bed is filled with oxygen at the pressure of the oxygen product tank, $P_{H1}$. Pretreated air (essentially dry and free of carbon dioxide) is then fed to the column and nitrogen is preferentially adsorbed rendering a purified oxygen product. When breakthrough is imminent, the adsorbent bed is saturated with air. To ensure that there is no surge of material into the bed in the subsequent rinse step, valves are opened allowing the contents of the column to reach the same pressure as the feed tank, $P_{H2}$. The rinse step begins by feeding pure nitrogen to the bed in a direction counter to feed. The pure nitrogen displaces the air which is recovered in the feed tank. In so doing, the adsorbent bed becomes saturated with nitrogen. Therefore, during the following blowdown step, pure nitrogen is recovered as the pressure drops from $P_{H2}$ to $P_L$. At least part of this nitrogen must be recompressed (to $P_{H3}$) for use in the subsequent rinse step. The differences between $P_{H1}$, $P_{H2}$, and $P_{H3}$ are minor.

In this process the primary PSA separation is performed in a single column. In a commercial scale version of the process, three (or more) columns could be connected in parallel to minimize flow rate fluctuations and to minimize the need for surge tanks. In such an arrangement, the products of one column could be used directly in the other columns, e.g. for purge, pressurization, and rinse.

To predict trends of performance as affected by operating conditions and properties of the components, a theory was assembled from previously explored concepts. Among the relevant features were: local equilibrium represented by binary, linear isotherms, and incomplete purge [see: Knaebel and Hill, Chem. Eng. Sci., 40(12) p. 235-60, (1985); and Matz and Knaebel, AIChE Journal, 34(9) p. 1486-92 (1988)]. Since these subjects have been covered previously, they are presented only briefly here.

Figure 3:
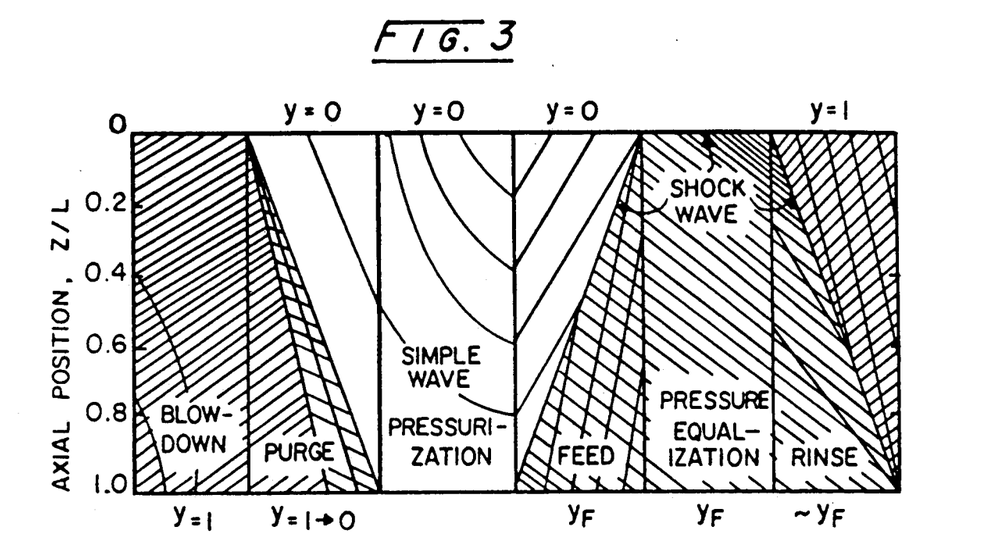
FIG. 3 provides a graphic presentation of characteristics and wave trajectories within the adsorbent bed during practice of a cycle, with complete purge, of the PSA method of the invention.
Figure 4:
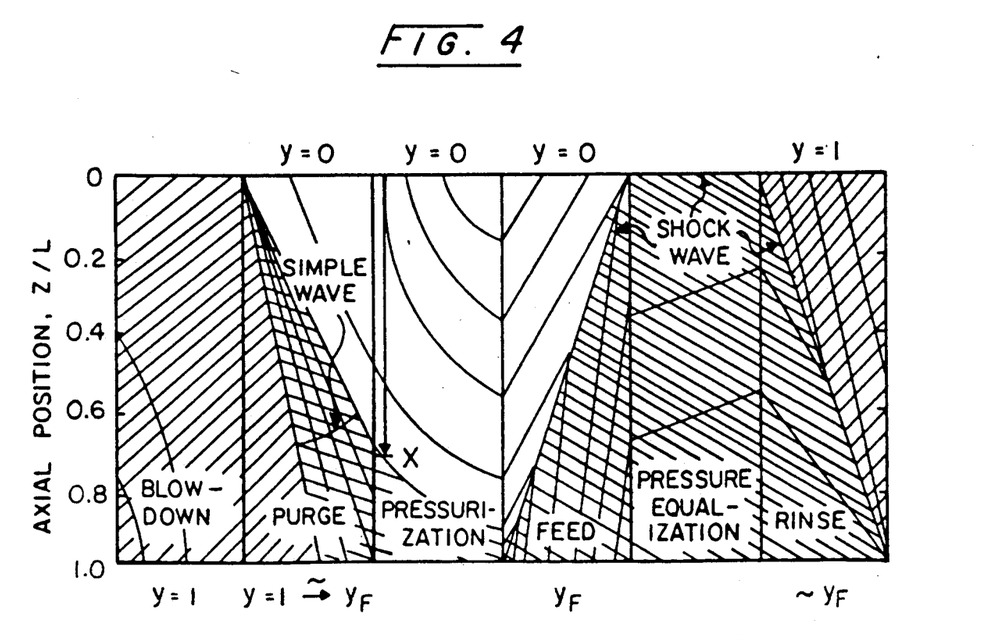
FIG. 4 provides a graphic presentation of characteristics and wave trajectories within the adsorbent bed during practice of a cycle, with incomplete purge, of the PSA method of the invention.

The purge step employs the less strongly adsorbed component as influent. It forms a simple wave upon infiltrating the adsorbent bed which contains the pure, more strongly adsorbed component. This wave expands as it propagates over the length of the column. FIG. 3, depicts the position and time of various composition fronts in the column during the cycle, based on complete purge. FIG. 4 is basically the same as FIG. 3, but it is based on incomplete purge, which also affects the pressurization and feed steps. Obviously, sufficient purge must occur to drive off a sufficient portion of the more strongly adsorbed component so that its mole fraction in the bed is lower than that in the feed. This amount can be determined experimentally or theoretically, as follows.

The extent of purge is considered as a fraction of complete purge, expressed as $$X = \beta_A u_L t_L / L = N_{PU} / N^*_{PU} \tag{1}$$

where $$\beta_A = 1 / \left(1 + \left(\frac{1-\epsilon}{\epsilon}\right) k_A\right),$$

where $\epsilon$ is the adsorbent bed porosity, and $k_A$ is the slope of the isotherm of component A, $u_L$ is the influent velocity during the purge step, $t_L$ is the duration of the purge step, L is the length of the packed bed, and $$N^*_{PU} = \phi = \frac{\epsilon A_{cs} L P_L}{\beta_A RT}$$

is the number of moles required for complete purge, as given by Knaebel and Hill, supra, [1985].

To evaluate the performance of the PSA cycle, it is critical to determine the position-versus-composition profile in the column at the end of the purge step. Equation (2), which is a characteristic relation, predicts this profile by simply selecting a composition, $Y_0$, and computing the corresponding position.

$$\left.\frac{\Delta z}{\Delta t}\right|_{y_0} = \frac{\beta_A u_L}{[1 + (\beta - 1)y_0]^2} = \frac{z_0 - L}{t_L} \tag{2}$$

where $Y_0$ is an arbitrary mole fraction of the more strongly adsorbed component (A) and $\beta = \beta_A / \beta_B$, with $\beta_B$ defined in the same manner as $\beta_A$.

That profile is translated into a corresponding profile at the end of the pressurization step. Finally, that profile is integrated into the analysis of the shock wave propagation during the feed step.

The path of the shock wave is given by:

$$u_{SH} = \left.\frac{dz}{dt}\right|_{SH} = \frac{\beta_A u_H}{1 + (\beta - 1)y_S} \tag{3}$$

Since the composition at the leading edge of the shock wave, $Y_S$, varies nonlinearly along the shock path, it is usually necessary to determine the path by numerical integration, e.g. via a Runge-Kutta method. The result of this integration is the duration of the feed step, $t_H$.

The number of moles of the less strongly adsorbed component required to pressurize the column is:

$$N_{PR} = N^*_{PR} + \Delta \tag{4}$$

where $N^*_{PR}$ is the moles required for pressurization of a completely purged column, as given by Knaebel and Hill, supra, [1985], and $\Delta$ is the additional material required to pressurize the column due to the presence of the more strongly adsorbed component. The latter quantity must be assessed from the initial and final concentration profiles within the column.

The number of moles fed to the column during the feed step is:

$$N_H = \phi \, \psi_1 \, \beta_A \, u_H \, t_H / L \qquad (5)$$

where $\psi_1 = P_{H1}/P_L$ and $u_H$ is the feed velocity. This material has a composition denoted by $Y_F$, the mole fraction of the more strongly adsorbed component. The number of moles of the pure, less strongly adsorbed component produced during the feed step is:

$$H_{HP} = N_H (1 + (\beta - 1) Y_F) \qquad (6)$$

The number of moles of the pure, more strongly adsorbed component fed to the column during the rinse step is:

$$N_R = \phi \, \psi_2 \, (1 + (\beta - 1) Y_F) \qquad (7)$$

where $\psi_2 = P_{H2}/P_L$, and the number of moles produced during the rinse step, having essentially the same composition as the feed, is:

$$N_{RP} = \phi \, \psi_2 \, \beta \qquad (8)$$

The number of moles of the pure, more strongly adsorbed component released during the blowdown step is:

$$N_{BD} = \phi (\psi_2 - 1) \qquad (9)$$

Finally, the recovery of pure products, i.e. the ratio of the number of moles of the component in the product to that entering the process in the feed, can be predicted by combining these relations. Specifically, the recoveries of pure component A and B are:

$$R_A = \frac{N_{BD} - N_R}{y_F (N_H - N_{RP})} \qquad (10)$$

$$R_B = \frac{N_{HP} - N_L - N_{PR}}{(1 - y_F)(N_H - N_{RP})} \qquad (11)$$

The effects of the extent of purge and pressure ratio on these recoveries have been studied for the application of splitting air to get nitrogen (A) and oxygen (B). The results are presented later in the specific examples, which follow.

EXAMPLES

Figure 5:
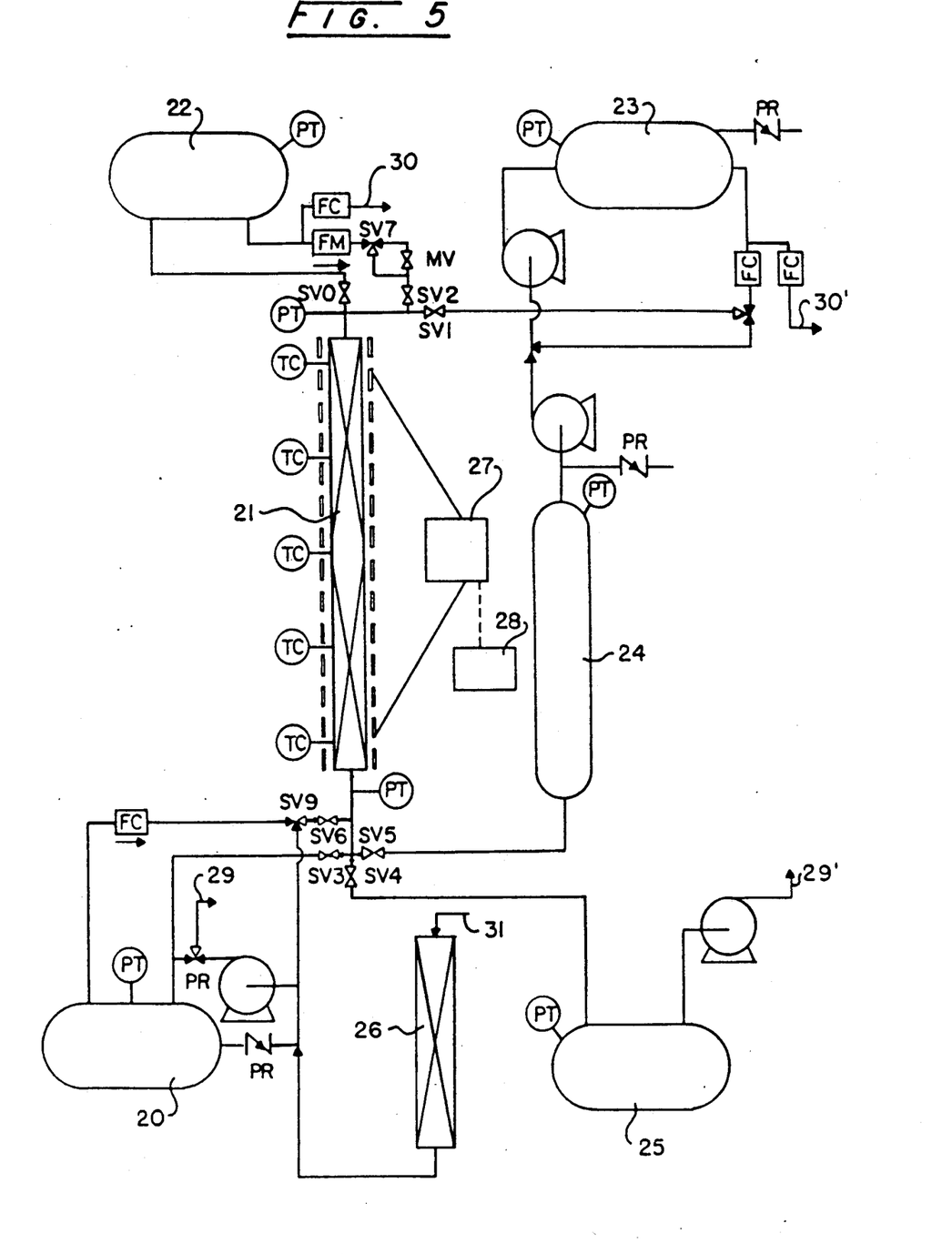
FIG. 5 shows in schematic format useful equipment, instruments, apparatus, flow lines, various valves and the like in an assembled system or arrangement useful for practice of the method of the invention.

FIG. 5 shows the equipment, instruments, and a system used in the example practices of the PSA method of the invention. The system was designed to enable laboratory evaluation of the PSA cycle under a wide range of conditions. To achieve this flexibility, the system was more complex than necessary for a specific set of conditions, and thus does not necessarily describe the best system for commercial practice, but does illustrate the best mode known and a useful system for practice in the laboratory. To better understand the illustrated FIG. 5 schematic format, the legends employed therein for various components are as follows: FC—flow controller; MV—metering valve; PV—plug valve; PT—pressure instrument; PR—pressure relief valve; FM—flow meter; TC—thermocouple; SV—solenoid valve with designating normally closed and designating normally open.

Figure 6:
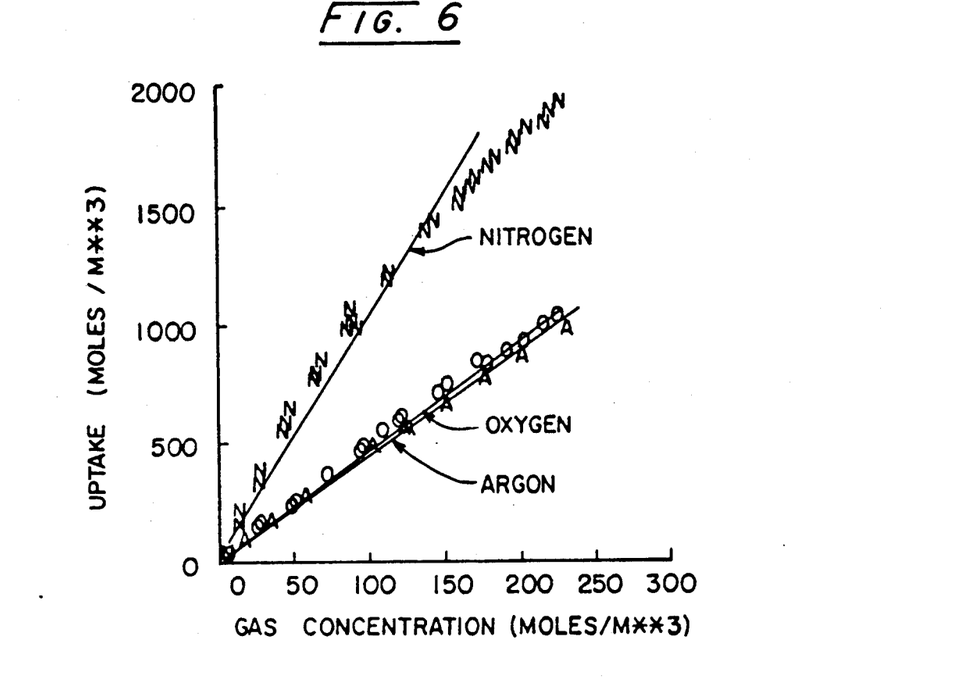
FIG. 6 presents graphically isotherms of nitrogen, oxygen and argon on zeolite 5A at 45° C. and a maximum pressure of 90 psia.

A single column was used in the system. The column was filled with 5A zeolite (16×40 mesh, Medical Grade, Union Carbide). As mentioned previously, linear isotherms were presumed, and oxygen and argon were presumed to behave as a single component. The relevant isotherms for nitrogen, oxygen, and argon are shown in FIG. 6, and they are believed to justify these assumptions.

Seven examples were made of practices of the PSA method of the invention. Table 1, which follows, shows the pertinent operating conditions for each practice. Likewise, Tables 2 and 3 which follow, list the oxygen product results and nitrogen product results, respectively. The product recoveries were calculated from the respective ratio of the moles of the component in the product to that in the feed:

$$R_{exp,i} = Y_{Pi} Q_{Pi} / (Y_{Fi} Q_F) \qquad (12)$$

where species i is either oxygen or nitrogen.

TABLE 1

Operating conditions for the practices

| Practice Number | Purge Flow Rate[1] | Pressure Ratios Feed, Rinse | Flow rates[1] Feed, Rinse | Step Times[2] Feed, Rinse |
|---|---|---|---|---|
| 1 | 0.31 | 16.35, 17.87 | 2.45, 2.25 | 99, 84 |
| 2 | 0.31 | 16.35, 17.66 | 3.25, 2.25 | 73, 82 |
| 3 | 0.31 | 16.17, 17.66 | 2.45, 2.75 | 98, 65 |
| 4 | 0.31 | 19.27, 21.21 | 2.45, 2.25 | 114, 98 |
| 5 | 0.31 | 9.91, 10.88 | 2.45, 2.25 | 88, 76 |
| 6 | 0.49 | 6.22, 7.07 | 2.45, 2.25 | 86, 79 |
| 7 | 0.77 | 6.54, 7.07 | 2.45, 2.25 | 89, 79 |

[1] All flow rate units are slpm.
[2] All units of step time are seconds; and the step times for the other steps were
Pressure Equalization ~10
Blowdown ~50
Purge ~50
Pressurization ~10

TABLE 2

Oxygen product[1] results for the practices

| Practice Number | Recovery[2] | Purity |
|---|---|---|
| 1 | 0.823 | 98.0% |
| 2 | 0.792 | 97.2 |
| 3 | 0.898 | 97.8 |
| 4 | 0.862 | 99.2 |
| 5 | 0.674 | 98.4 |
| 6 | 0.643 | 99.3 |
| 7 | 0.273 | 99.2 |

[1] Oxygen as a product implies both oxygen and argon, so the difference in purity from 100% represents nitrogen.
[2] As determined by equation 12.

TABLE 3

Nitrogen product results for the practices

| Practice Number | Recovery[1] | Purity |
|---|---|---|
| 1 | 0.745 | 99.0% |
| 2 | 0.798 | 99.0% |
| 3 | 0.875 | 99.0% |
| 4 | 0.824 | 98.9% |
| 5 | 0.618 | 99.0% |
| 6 | 0.564 | 98.2% |
| 7 | 0.484 | 98.2% |

[1] As determined by equation 12.

Figure 7:
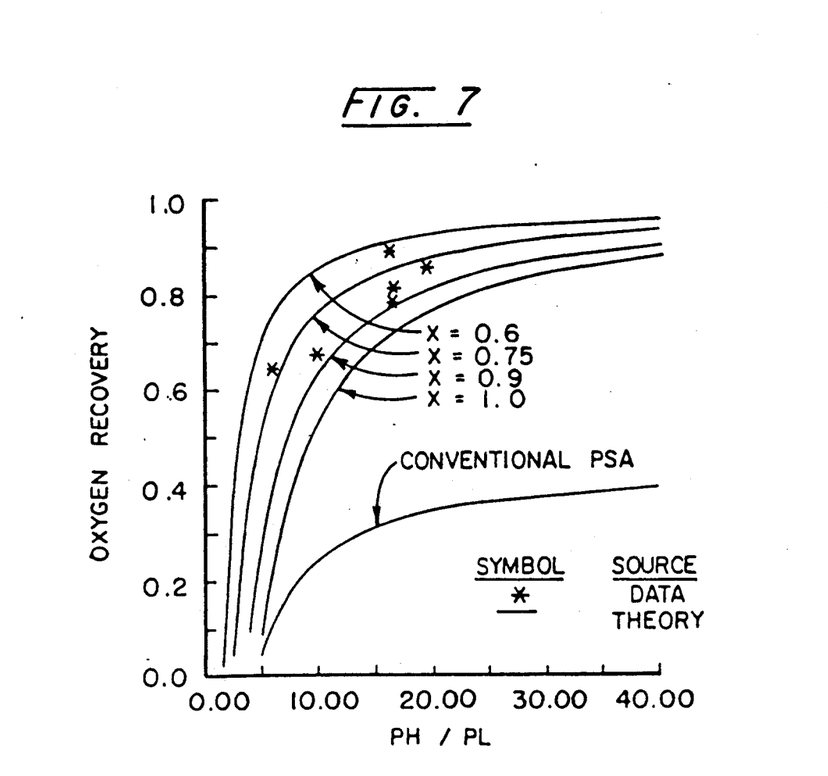
FIG. 7 presents graphically the recovery of the product gas rich in oxygen as a function of pressure ratio for various extents of purge, X, in practices of the PSA cycle of the invention, and also as calculated by theory with conditions shown are for air separation with zeolite 5A at 45° C.
Figure 8:
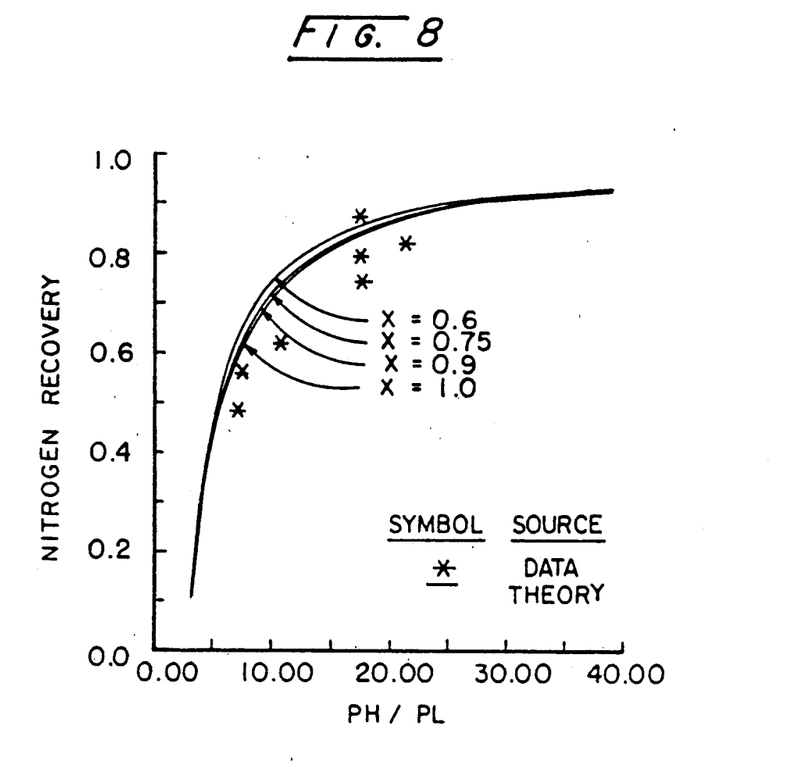
FIG. 8 presents graphically the recovery of product nitrogen gas as a function of various extents of purge, X, in practices of the PSA cycle of the invention, and also as calculated by theory with conditions shown being for air separation with zeolite 5A at 45° C.

FIGS. 7 and 8 show the product recovery of oxygen and nitrogen, respectively, for each practice of example as a function of the average pressure ratio. Those figures also show the predictions of the theory described earlier, computed at various extents of purge.

Solenoid valves were operated in a predetermined sequence, as indicated in Table 4, which follows. The switching was done by a microcomputer, either with specified time intervals, or with intervals estimated in real-time based on imminent breakthrough of certain steps, as explained later.

TABLE 4

| Solenoid valve positions[1] for the six-step cycle | |
|---|---|
| Step | Valves Open |
| Blowdown | 5 |
| Purge | 2, 4 |
| Pressurization | 2, 7 |
| Feed | 0, 6, 9 |
| Pressure Equalization | 6, 9 |
| Rinse | 1, 3, 8 |

[1]Solenoid valve positions are closed for the valves not designated as open.

All tanks in the experimental apparatus, excluding the nitrogen surge tank, were large (46 liters) to minimize fluctuations. Consequently, several hours were typically required for the system to reach cyclic steady-state. Stainless steel tubing and fittings were used to connect all vessels in the system. Fittings at the top and bottom of the column were chosen to minimize dead volume.

The average bed temperature was controlled by a heating tape wrapped around the column that was regulated with a variac. The product and feed pressures were chosen, and influent flow rates during the feed and rinse steps were set via flow controllers. To allow for pressure drip through the column and fittings, the pressures in the oxygen product tank, feed air tank, and nitrogen product tank were kept at 0.25 atm intervals. During a typical cycle, each tank pressure varied by about 0.17 atm.

To maintain the feed tank pressure, an adjustable pressure relief valve was set to crack at the desired pressure. That overflow was routed into the suction side of the feed air compressor. Other recycle lines were incorporated in the apparatus to maintain constant flow rates during the feed and rinse steps, respectively. Both the oxygen and the nitrogen product tank pressures were regulated by adjusting the flow of pure product from each tank using mass flow controllers.

Minor adjustments in these net product stream flow rates were made over the course of an experiment, until cyclic steady-state was reached. In the blowdown step, the step time had to be sufficiently long to allow the pressure in the column to become virtually constant. Similarly, it was necessary to adjust the length of the purge step and the purge flow rate to achieve an adequate extent of purge.

Two critical steps in this six-step cycle are the feed step and the rinse step. These are characterized by the formation and propagation of shock waves. All of the major measures of performance, including product purities and product recoveries, depend on these steps achieving imminent breakthrough. Each of the two shock waves is a sharp mass transfer front, resulting from nearly instantaneous adsorption of the more strongly adsorbed component. The rate of propagation through the adsorption bed is affected by the influent gas flow rate and effluent gas composition.

When the feed step time is too short, the shock wave does not traverse the full length of the bed and some productivity is lost. Yet, when it is too long, the shock wave breaks-through, which results in contamination of the oxygen product. Conversely, when the rinse step time is too short, some of the less strongly adsorbed component remains in the bed, which contaminates the product obtained during blowdown, i.e. the more strongly adsorbed component. Finally, if it is too long, some of the pure, more strongly adsorbed component escapes to the feed tank, which imposes a greater burden on the adsorbent during the subsequent feed step.

To avoid those potential deleterious effects, the temperature-front-sensing method of Matz and Knaebel Ind. Eng. Chem. Res., 26(8), p. 1638–1645 (1987) was employed to ascertain the propagation rate of the shock wave. It allowed the feed step to be stopped when breakthrough was imminent. The same approach was used to control the duration of the rinse step, but this step was stopped just after breakthrough occurred. A variable lag was deducted from each predicted step time to account for system measurement delays.

The purge step time was adjusted to ensure adequate (but not necessarily complete) purge was achieved, as discussed in the theory teachings. The other three step times (blowdown, pressurization, and pressure equalization), within a reasonable range, were relatively unimportant.

The guard column consisted of regenerated zeolite 5A, which removed moisture and carbon dioxide from air at ambient conditions. The net product flow rates were measured by a wet test meter, and the feed flow rate was measured by the displacement of a soap bubble through a buret. The product compositions were sensed by a multichannel mass spectrometer.

Further description of equipment and materials employed in the just described specific examples follows:

| | |
|---|---|
| Materials: | Union Carbide molecular sieve MG 5A, 16 × 40 mesh, Lot number 935585020045-S-21. |
| | Oxygen - zero grade, 99.993% pure, Linde Specialty Gases. |
| | Nitrogen - high purity, dry grade, 99.99% pure, Linde Div. of Union Carbide. |
| | Argon - AGA Gas, pre-purified, 99.996% pure. |
| Computer: | Digital Equipment Corp. PDP LSI-11/73 |
| | 1 Mb Semiconductor RAM |
| | 2, 5.25" floppy disk drives |
| | 1 40Mb Hard disk drive |
| | Data Translation, Inc. |
| | 32 analog input channels, +/− 10 volts |
| | 16 digital input channels, 5 volts |
| | 32 digital output channels, 5 volts |
| | 1 real-time programmable clock |
| Gas Analyzer | Perkin Elmer MGA 1200 Mass Spectrometer |
| | 10 gas capability |
| | 4 gas sampling ports, 0.015 slpm flow |
| Flow Rate | Unit Instrument Corp. |
| | Readout - Power Supply: |
| | 1 Model URS-100-5, 5 Channel |
| | Mass Flow Controllers: |
| | 1 Model UFC-2000 0–20 slpm nitrogen |
| | 1 Model UFC-2000 0–10 slpm nitrogen |
| | 1 Model UFC-1000 0–10 slpm air |
| | 1 Model UFC-1000 0–5 slpm oxygen |
| | Mass Flow Meters: |
| | 1 Model UFM-1000 0–10 slpm oxygen |
| | Precision 0.1 ft³ Wet Test Meter |

Pressure Instrumentation:
1 Sensotec Corp. 6-Channel Power Supply Model SA-10D
1 Sensotec Corp. 10-Channel Power Supply Model SA-10D
3 Sensotec Corp. Pressure Transducers Model A-105, 0–100 psia ± 0.5%
4 Sensotec Corp. Pressure Transducers Model A-5, 0–100 psia ± 1.0%
1 mercury U-tube manometer Temperature Instrumentation:
8 Omega Quick Disconnect K-Type thermocouples, exposed -continued

| | |
|---|---|
| junction, 0.0625 in. dia. sheath. | |
| Other Equipment: | |
| Column: | Stainless steel, 100 cm long, 2.54 cm O.D., 2.08 cm ID. Packed with 261 g of zeolite 5A; bulk density = 0.772 g/cm$^3$ |
| Tubing: | Stainless steel, 0.635 cm O.D., 0.38 cm I.D. |
| Pressure relief valve: | Nupro, model 4CPA2-50 |
| Compressors: | |
| | 2 KNF model NO35.1.2 ANP Twin Diaphragm; Max. vacuum - 27" Hg. Max diff. pressure - 60 psig continuous, capacity - 62 slm. |
| | 2 KNF model NO35 ANP Single Diaphragm; Max. vacuum −27" Hg Max. diff. pressure - 60 psig continuous, capacity - 32.5 slm |
| Heating tape: | 2 Thermolyne 120 volt 72" × 1" heavy insulation. |
| Variac: | 120 volt Powerstat Autotransformer. |
| Solenoid valves: | |
| | 6 2-way ITT General Controls, model S30. |
| | 3 3-way ITT General Controls, model S30. |

From the just described disclosure and examples it should be apparent that a PSA cycle that exploits equilibrium selectively has been provided. The cycle can comprise the six steps: blowdown, purge, pressurization, feed, pressure equalization, and rinse. With Zeolite 5A employed, pre-dried air was split into oxygen product and nitrogen product and at pressure ratios between about 6 and about 20 the level of impurities in the products was reduced to about 1% (i.e. $O_2$ in $N_2$, or $N_2$ in $O_2$) with corresponding product recoveries between 27% and 90% being obtained. For air separation it is contemplated to be possible to attain >99% purity consistently, possibly as high as >99.9%, without proceeding to beds in series and with recovery kept about as high as desired by increasing the pressure ratio under which the system operates and/or by recycling a small amount of a residual feed byproduct gas from practice of the PSA cycle. Additionally it is contemplated as feasible to apply the herein taught PSA cycle and process to other adsorbent/adsorbate combinations, such as $CH_4$ and CO with activated carbon (or zeolite 5A) and to obtain similar performance a that of the preceding examples and useful products.

While certain preferred embodiments of the present invention have been disclosed in detail, it is to be understood that various modifications may be adopted without departing from the spirit of the invention or scope of the following claims.

What is claimed is:

1. A method for production of high purity nitrogen and a product oxygen rich gas from air, which is essentially dry and free from carbon dioxide, which method consists essentially of repeated cycles of the steps, in sequence, comprising:
   1. feeding through a line of said air under pressure into one end and flowing through a column containing a bed of an adsorbent, which is a preferential adsorber for nitrogen in comparison to oxygen,
      a. with upon commencement of said feeding, the bed and column already saturated and pressurized to a superatmospheric pressure by pure oxygen, or by product oxygen rich gas from an earlier cycle, and
      b. discharging unadsorbed effluent of said feeding air from the other end of said bed which forms a front of air that moves through the column, which unadsorbed effluent be product oxygen rich gas, and with collection of the product oxygen rich gas in a collection vessel, and
      c. continuing said feeding and said discharging and said collection for about that time requisite for a front of air adsorption on said bed to progress to abut the other end of the bed from which said effluent is discharging with monitoring of the front, and
      d. thereupon ceasing said feeding upon said front progressing to abut the other end of the bed; and
   2. pressure equalizing the column and its contents by
      a. closing off access of the unadsorbed effluent in the collection vessel to the column, and
      b. opening an access to a storage vessel containing feed air at a pressure higher than the superatmospheric pressure in said column for said step 1 for said feeding, with
      c. pressures in said column and said storage vessel permitted to become substantially equal, and
      d. with said opening of said access to said storage vessel being to the line for said feeding of said air, then
   3. rinsing under superatmospheric pressure the column and its contents by
      a. feeding under pressure of pure nitrogen, or of high purity nitrogen produced in an earlier cycle, into said column and flowing therethrough, with
      b. the feeding under pressure of the pure nitrogen or of said high purity nitrogen, which forms a front of nitrogen that moves through the column, being into the column at the other end which in step 1. b. had been discharging unadsorbed effluent of said feeding air, and
      c. with an initial discharging from the one end of said column of a residual feed byproduct gas containing at least some air and with a flowing to and storage in said storage vessel of the initial discharging of said residual feed byproduct gas, and
      d. continuing the initial discharging of the residual feed byproduct gas for about that time for a front of nitrogen to just pass through the one end of the column with monitoring of the front and then discontinuing, upon the front just passing through the end of the column, the flowing of the residual feed byproduct gas to said storage vessel, thereupon the column and its contents are subjected to a
   4. blowing down by
      a. closing access from said column to said storage vessel, and
      b. discontinuing said step 3.a. feeding with a closing of said column from said step 3.a. feeding, and
      c. opening an entry to a nitrogen product surge tank for flow from said column thereto with the nitrogen product surge tank containing nitrogen at an absolute pressure of one-third to one-twentieth the pressure of the effluent of high purity nitrogen and present contents of said column, whereby
      d. said effluent of high purity nitrogen and nitrogen in said column surges from said column and passes into the nitrogen product surge tank, and then
   5. purging said column of high purity nitrogen by a. providing a feed of product oxygen rich gas at essentially the same low pressure as said absolute pressure of said nitrogen in step 4.c., into said column to withdraw and with withdrawal of waste or byproduct gas, both adsorbed and unadsorbed, in a direction from the column counter from said step 1 feeding of said air, and b. passing of said waste or byproduct gas of said withdrawal to the purge waste tank, with c. cessation of said purging following recovery and accumulation in the purge waste tank of not more than one-half of the amount of nitrogen in said air introduced by the feeding in said step 1., and then 6. pressurizing the column and the bed of adsorbent therein by a. flowing into the column of said product oxygen enriched gas until the bed and the column are saturated therewith and to the superatmospheric pressure for said step 1 of feeding of said air, with b. the flowing into the column of said product oxygen enriched gas being into the other end and in a direction counter to the direction of said step 1 feeding.

2. The method of claim 1 in which in step 1.c. said progress of said front of air adsorption on said bed is monitored by temperature sensing so as to determine said that time requisite for said front of air adsorption on said bed to progress from the one end to abut the other end of said bed.

3. The method of claim 2 in which in step 3. rinsing a progressive movement of the front of nitrogen on said bed is monitored by temperature sensing so as to determine said that time for said front of nitrogen to just pass from the other end through to the one end of the column.

4. The method of claim 3 in which in said step 4. blowing down, said step 4.d. effluent proceeds for said surges and passes in a direction counter to the direction of said step 1 feeding of said air into said one end of said column.

5. The method of claim 4 in which in step 5.a. said providing of the same low pressure is the providing of about one atmosphere.

6. The method of claim 5 in which in step 1.a. the superatmospheric pressure is between about 3 to 20 atmospheres.

7. The method of claim 5 employing for said bed of adsorbent about a 1 inch diameter by 39 inches long packed bed of granular zeolite 5A and in which times elapsing for said steps comprising a complete cycle are for said step 1 of feeding of between about 80 to 120 seconds, for said step 2 of pressure equalizing of about 10 seconds, for said step 3 of rinsing of between about 70 to 100 seconds, for said step 4 of blowing down of about 50 seconds, for said step 5 of purging of about 50 seconds, and for said step 6 of pressurization of about 10 seconds.

8. The method of claim 1 which includes:

(i) removing portions of product oxygen enriched gas from said collection vessel for utility purposes other than for said steps 5 and 6 for said purging and pressurizing of the column and bed of adsorbent; and (ii) transferring of high purity nitrogen from said nitrogen product surge tank to a nitrogen product tank with periodic withdrawals of portions therefrom and pressurization of such portions to said pressure for said feeding in step 3.a. and with removal of other portions of said high purity nitrogen from either or both of the nitrogen product tank and nitrogen product surge tank for purposes other than use in step 3 of said repeated cycles.

* * * * *